United States Patent
Amaike et al.

(10) Patent No.: US 6,593,680 B2
(45) Date of Patent: Jul. 15, 2003

(54) ULTRASONIC WAVE TRANSMITTER/RECEIVER

(75) Inventors: Shinji Amaike, Ishikawa-ken (JP); Junshi Ota, Ishikawa-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/855,286

(22) Filed: May 15, 2001

(65) Prior Publication Data

US 2002/0021056 A1 Feb. 21, 2002

(30) Foreign Application Priority Data

May 15, 2000 (JP) .................................. 2000-141703

(51) Int. Cl.[7] .............................................. H01L 41/08
(52) U.S. Cl. .................... 310/322; 310/324; 310/334
(58) Field of Search .................. 73/632, 642; 310/324, 310/336, 334, 330; 367/155, 163

(56) References Cited

U.S. PATENT DOCUMENTS

| | | | |
|---|---|---|---|
| 3,943,388 A | * | 3/1976 | Massa .......................... 310/312 |
| 4,556,814 A | * | 12/1985 | Ito et al. ....................... 310/326 |
| 5,446,332 A | * | 8/1995 | Rapps et al. ................. 310/321 |
| 5,955,824 A | * | 9/1999 | Saito et al. .................. 310/324 |
| 6,047,603 A | * | 4/2000 | Ohtera et al. ................ 310/322 |
| 6,250,162 B1 | * | 6/2001 | Amaike et al. .............. 310/334 |

FOREIGN PATENT DOCUMENTS

| JP | 2000-32594 | | 1/2000 | |
|---|---|---|---|---|
| JP | 2001169392 A | * | 6/2001 | ........... H04R/17/00 |

* cited by examiner

*Primary Examiner*—Mark O. Budd
(74) *Attorney, Agent, or Firm*—Keating & Bennett, LLP

(57) ABSTRACT

An ultrasonic wave transmitter/receiver is provided in which the transmission/reception range thereof in at least one direction is relatively narrow, and which has stable reverberation characteristics. When the thickness of a thick-walled portion is t1, the thickness of each of thin-walled portions is t2, the thickness of a side portion provided continuously with the thin-walled portion is A, x=t2/t1, and y=A/t2, this ultrasonic wave transmitter/receiver is formed so that x and y are within the range defined by the following equations:

$0.50 \leq x \leq 0.64$ $0.75 y \leq 1.75$ $y \leq -(50/7) \cdot x + 163/28$ $y \geq -(50/7) \cdot x + 135/28$

1 Claim, 6 Drawing Sheets

ULTRASONIC WAVE TRANSMITTER/RECEIVER

BACKGROUND OF THE INVENTION

1. Field of the Invention

The present invention relates to an ultrasonic wave transmitter/receiver used as, for example, a clearance sensor and a back sensor for use in automobile.

2. Description of the Related Art

Hitherto, an ultrasonic wave transmitter/receiver is known in which a piezoelectric vibrating element is fixed on the inner bottom surface of a cylindrical case with a bottom, and which uses the outer bottom surface of the case as an ultrasonic wave transmitting/receiving surface. When using such an ultrasonic wave transmitter/receiver as a sensor for use in a car, if the transmission/reception range in the vertical direction is too wide with respect to the ground, reflected waves from the ground are detected as noises, and if the transmission/reception range in the horizontal direction is too narrow, the detection range has a blind spot. Neither of these is desirable. Accordingly, an ultrasonic wave transmitter/receiver has been invented which is arranged so that its transmission/reception range in the vertical direction is narrow and so that its transmission/reception range in the horizontal direction is wide, by forming the hollow portion of the case so as to be long in the vertical direction and short in the horizontal direction, and further by forming a thick-walled portion and thin-walled portions on the bottom of the case. In such an ultrasonic wave transmitter/receiver, for example, by forming a thick-walled portion with a thickness of 0.75 mm and thin-walled portions with a thickness of 0.3 mm on the case bottom with a diameter of 18 mm, and by disposing the thin-walled portions in the vertical direction, an ultrasonic wave transmitter/receiver wherein the transmission/reception range in the vertical direction is 40°, can be obtained.

FIG. 9 shows an example of an ultrasonic wave transmitter/receiver 1 used as a back sensor for use in a car. The transmission/reception range is expressed by a full angle at half maximum. The "full angle at half maximum" refers to an angle formed by both directions at which a reduction of 20·log0.5 dB (about 6 dB) in the transmission/reception sensitivity occurs with respect to the transmission/reception sensitivity in the direction opposite to the bottom (the direction of 0°).

However, in such a conventional ultrasonic wave transmitter/receiver, since the reverberation characteristics are unstable and the reverberation time is long, ultrasonic waves reflected from an object adjacent to the ultrasonic wave transmitter/receiver can interfere with the reverberation thereof, so that there are cases where the existence of the adjacent object cannot be detected and/or where the distance to the adjacent body cannot be measured. In particular, when water drops are adhered on the transmitting/receiving surface, the reverberation time is prone to be longer, and hence, a problem occurs when using this ultrasonic wave transmitter/receiver as a sensor for use in a car, the sensor being exposed to wind and rain.

SUMMARY OF THE INVENTION

Accordingly, it is an object of the present invention to provide an ultrasonic wave transmitter/receiver in which the transmission/reception range thereof in at least one direction is relatively narrow, and which has stable reverberation characteristics.

In accordance with the present invention, there is provided an ultrasonic wave transmitter/receiver which comprises a cylindrical case with a bottom, a piezoelectric vibrator fixed on the inner bottom surface of the bottom of the case, and an ultrasonic wave transmitting/receiving surface defined by the outer bottom surface of the bottom of the case. In this ultrasonic wave transmitter/receiver, the bottom of the case includes a thick-walled portion on which the piezoelectric vibrator is fixed, and a thin-walled portion thinner than the thick-walled portion. When the thickness of the thick-walled portion is t1, the thickness of the thin-walled portion is t2, the thickness of a side portion provided continuously with the thin-walled portion is A, and the equations are set as $x = t2/t1$, and $y = A/t2$, this ultrasonic wave transmitter/receiver is formed so that x and y are within the range defined by the following equations:

$$0.50 \leq x \leq 0.64$$

$$0.75 \leq y \leq 1.75$$

$$y \leq -(50/7) \cdot x + 163/28$$

$$y \geq -(50/7) \cdot x + 135/28$$

The above and other objects, features, and advantages of the present invention will be clear from the following detailed description of the preferred embodiments of the invention with reference to the accompanying drawings.

DESCRIPTION OF THE PREFERRED EMBODIMENTS

Figure 1:
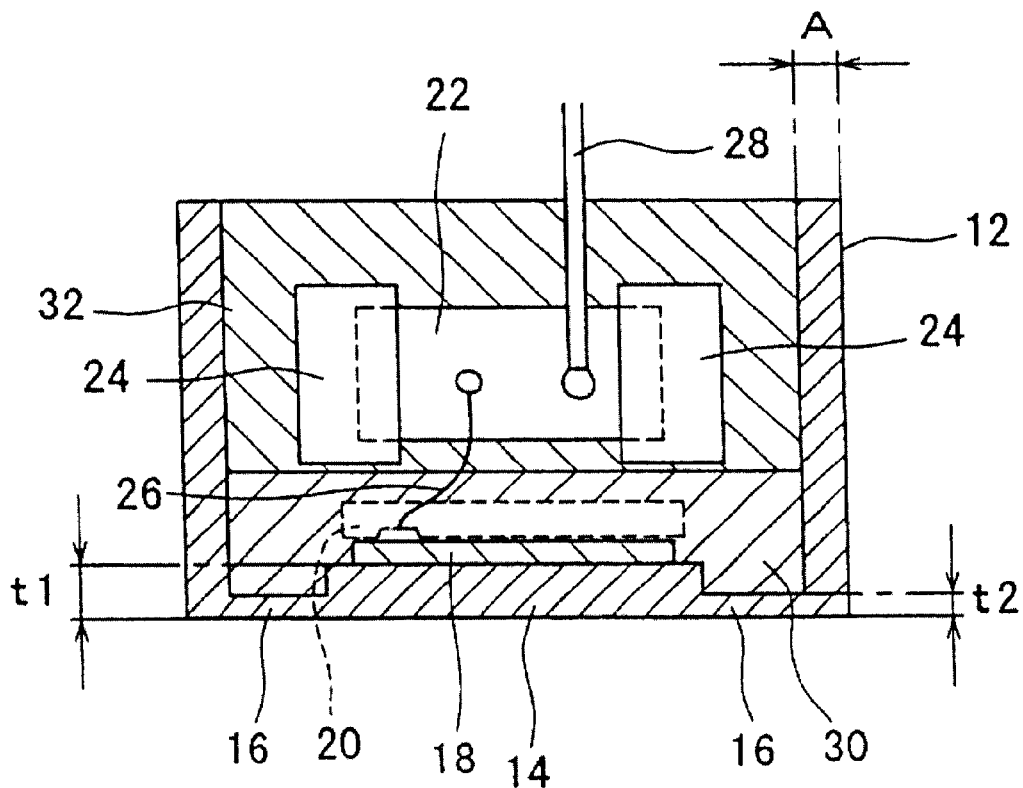
FIG. 1 is a diagrammatic sectional view showing an ultrasonic wave transmitter/receiver in accordance with an embodiment of the present invention.

FIG. 1 is a sectional view showing an ultrasonic wave transmitter/receiver in accordance with an embodiment of the present invention. This ultrasonic wave transmitter/receiver 10 includes a substantially cylindrical case 12. The case 12 is, for example, made of aluminum. On the inner bottom of the case, a thick-walled portion 14 and thin-walled portions 16 are formed. A piezoelectric vibrating element 18 is fixed on the thick-walled portion 14 in the inner bottom of the case 12. One electrode of the piezoelectric vibrating element 18 is connected to the case which is grounded. A sound absorbing material 20 is disposed on the opposite side to inner bottom surface of the case 12 with the piezoelectric vibrating element 18 therebetween.

A capacitor 22 is disposed opposite to the piezoelectric vibrating element 18 across the absorbing material 20. Fixation members 24 constituted of silicone rubber or the like are each fitted to both ends of the capacitor 22. One electrode of the capacitor 22 and the other electrode of the piezoelectric vibrating element 18 are electrically connected by a lead 26. An external terminal 28 is connected to the one electrode of the capacitor 22. The other electrode of the capacitor 22 is connected to the case which is grounded, by a lead (not shown). Also, an external terminal (not shown) is provided on the case 12.

The inner bottom of the case 12 is filled with a first adhesive 30 such as a silicone-based adhesive having a relatively high viscosity. The first adhesive covers the sound absorbing material 20 and the piezoelectric vibrating element 18. The purpose of using an adhesive having a high viscosity, is to minimize the influences of the adhesive impregnated into sound absorbing material upon the acoustic characteristics. After the first adhesive 30 has been cured, the fixation members 24 on both sides of the capacitors 22 are placed thereon. Furthermore, a second adhesive 32 such as a silicone-based adhesive having a relatively low viscosity is filled thereover. The reason for using an adhesive with a low viscosity as the second adhesive, is to facilitate the filling work.

Figure 2A:
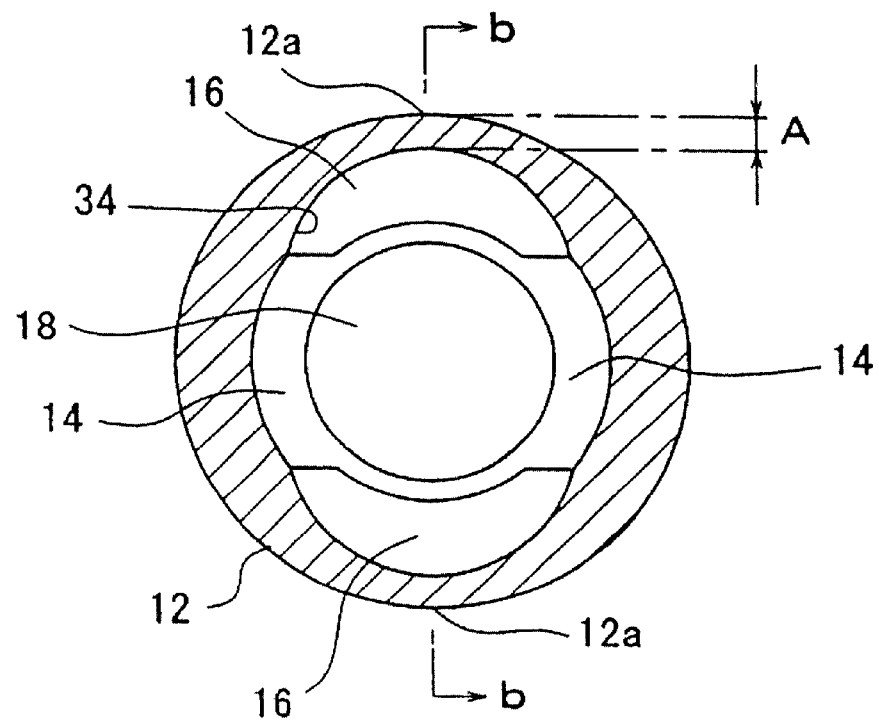
FIG. 2A is a cross sectional view illustrating an example of a case of the ultrasonic wave transmitter/receiver shown in FIG. 1, the case being taken along a plane parallel with the bottom surface thereof.
Figure 2B:
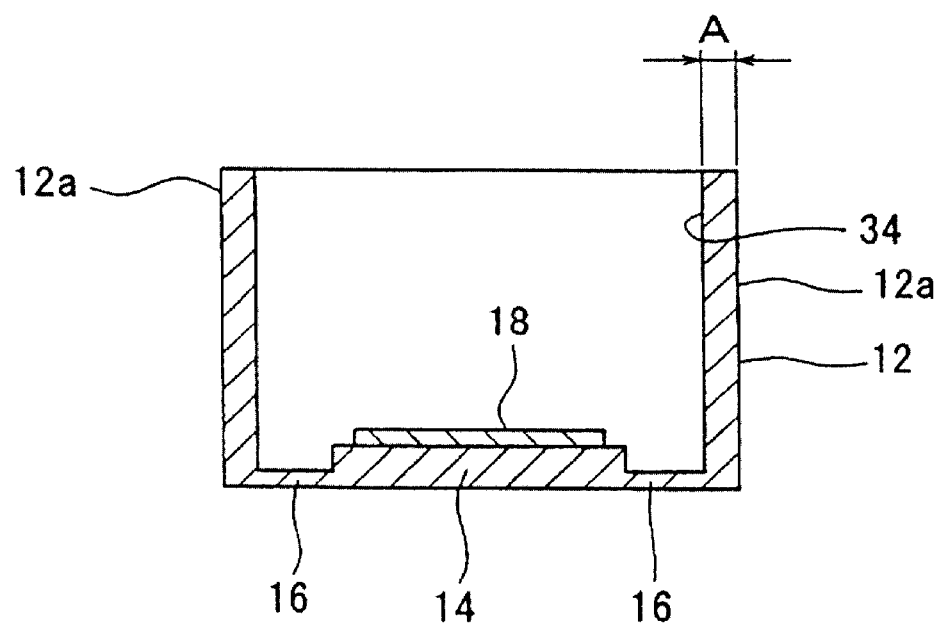
FIG. 2B is a vertical section showing the case taken along a line b—b in FIG. 2A.
Figure 3:
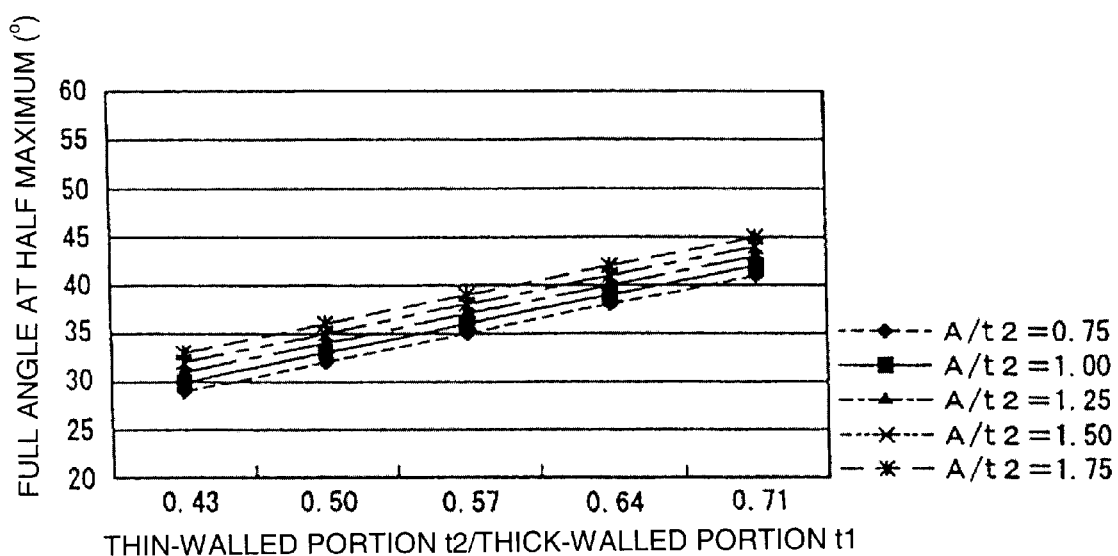
FIG. 3 is a diagram showing the relationship between $t2/t1$ and the full angle at half maximum when $A/t2$ is varied.
Figure 4:
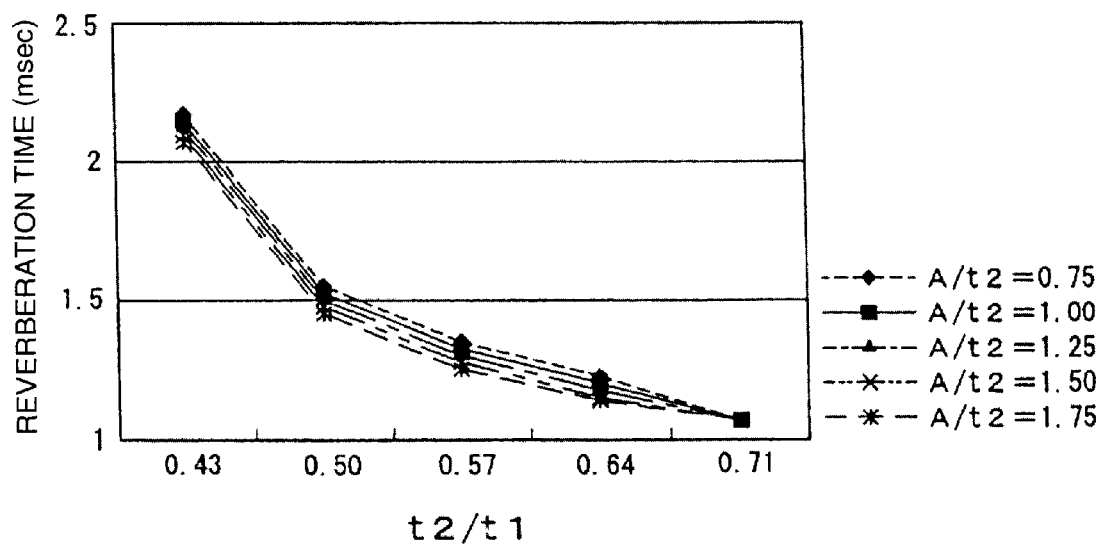
FIG. 4 is a diagram showing the relationship between $t2/t1$ and the reverberation time when $A/t2$ is varied.
Figure 5:
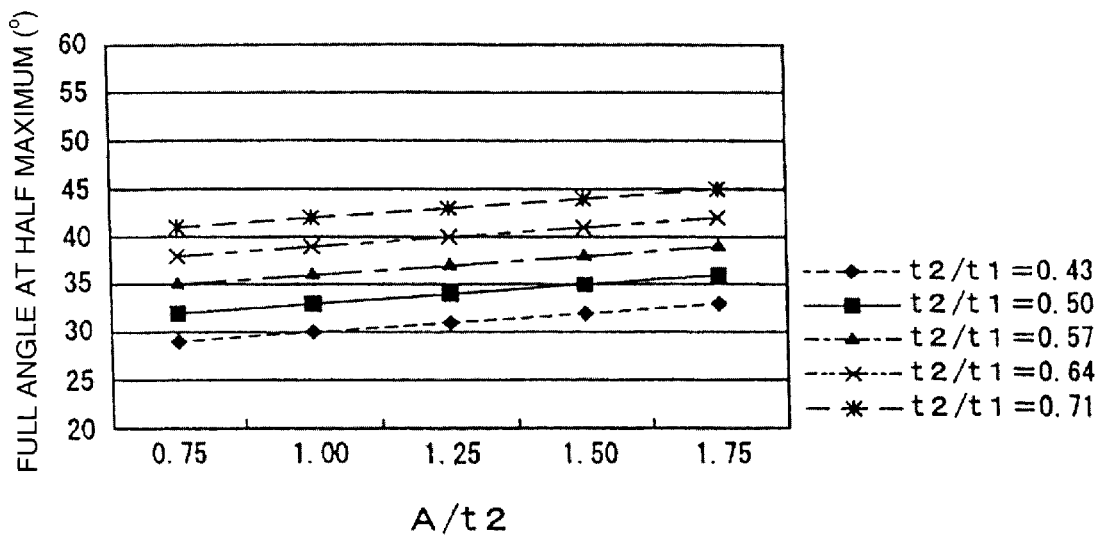
FIG. 5 is a diagram showing the relationship between $A/t2$ and the full angle at half maximum when $t2/t1$ is varied.
Figure 6:
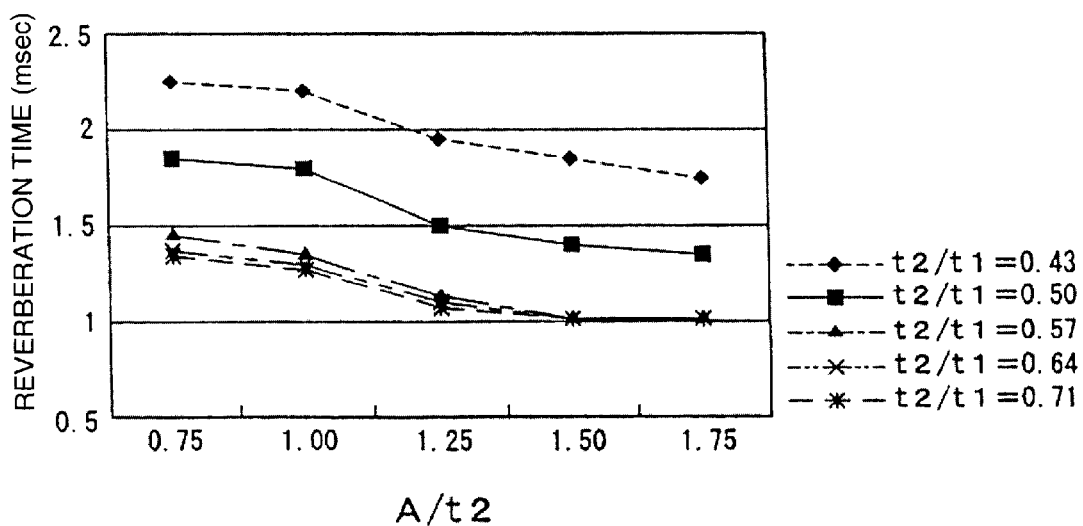
FIG. 6 is a diagram showing the relationship between $A/t2$ and the reverberation time when $t2/t1$ is varied.

FIG. 2A is a cross sectional view illustrating an example of the case 12 of the ultrasonic wave transmitter/receiver 10 shown in FIG. 1, the case being taken along a plane parallel with the bottom thereof, and FIG. 2B is a vertical section showing the case taken along a line b—b in FIG. 2A. As shown in FIG. 2A, a hollow portion of the case 12 is formed into, for example, a substantially oval shape in a plan view. In the direction of the long axis of the oval, the thin-walled portions 16 thinner than the thick-wall portion 14 are formed on both sides of the thick-wall portion 14. On the other hand, the thick-wall portion 14 is formed so as to extend in the direction of the short axis of the oval. The ultrasonic wave transmitter/receiver 10 shown in FIG. 1 is used so that the direction of the long axis of the cross section of the case 12 is set in the direction vertical with respect to the ground, and the short axis thereof is set in the direction horizontal with respect to the ground. In the ultrasonic wave transmitter/receiver 10, the outer bottom surface of the case 12 defines a transmitting/receiving surface. Here, the shape of the cross section of the case 12 is not limited to substantially oval shape, but the cross section thereof may be formed into a substantially rectangular shape, a substantially elliptic shape, or a substantially circular shape.

By varying the thickness of the thick-walled portion 14, each of the thin-walled portions 16, and the side portion 12a provided continuously with the thin-walled portions 16, of the case shown in FIG. 2, full angles at half maximum and reverberation times of the ultrasonic wave transmitter/receiver 10 using these cases 12 were measured. The measurement results are shown in Tables 1 to 10, and FIGS. 3 to 6. Here, the case 12 used in this embodiment is entirely formed of aluminum and have a diameter of 18 mm.

TABLE 1

$A/t2 = 0.75$

| | | $t2/t1$ | | | | |
|---|---|---|---|---|---|---|
| | | 0.43 | 0.50 | 0.57 | 0.64 | 0.71 |
| Full angle at half maximum (°) | AVE | 29 | 32 | 35 | 38 | 41 |
| Reverberation time (ms) | AVE | 2.18 | 1.56 | 1.35 | 1.22 | 1.07 |
| | MAX | 2.40 | 1.75 | 1.50 | 1.35 | 1.15 |
| | MIN | 2.05 | 1.45 | 1.25 | 1.15 | 1.00 |

TABLE 2

$A/t2 = 1.00$

| | | $t2/t1$ | | | | |
|---|---|---|---|---|---|---|
| | | 0.43 | 0.50 | 0.57 | 0.64 | 0.71 |
| Full angle at half maximum (°) | AVE | 30 | 33 | 36 | 39 | 42 |
| Reverberation time (ms) | AVE | 2.15 | 1.53 | 1.32 | 1.19 | 1.07 |
| | MAX | 2.35 | 1.70 | 1.45 | 1.30 | 1.15 |
| | MIN | 2.00 | 1.40 | 1.20 | 1.10 | 1.00 |

TABLE 3

$A/t2 = 1.25$

| | | $t2/t1$ | | | | |
|---|---|---|---|---|---|---|
| | | 0.43 | 0.50 | 0.57 | 0.64 | 0.71 |
| Full angle at half maximum (°) | AVE | 31 | 34 | 37 | 40 | 43 |
| Reverberation time (ms) | AVE | 2.12 | 1.50 | 1.29 | 1.17 | 1.07 |
| | MAX | 2.30 | 1.65 | 1.40 | 1.30 | 1.15 |
| | MIN | 1.95 | 1.35 | 1.15 | 1.10 | 1.00 |

TABLE 4

$A/t2 = 1.50$

| | | $t2/t1$ | | | | |
|---|---|---|---|---|---|---|
| | | 0.43 | 0.50 | 0.57 | 0.64 | 0.71 |
| Full angle at half maximum (°) | AVE | 32 | 35 | 38 | 41 | 44 |
| Reverberation time (ms) | AVE | 2.10 | 1.48 | 1.27 | 1.15 | 1.07 |
| | MAX | 2.25 | 1.60 | 1.35 | 1.25 | 1.15 |
| | MIN | 1.90 | 1.30 | 1.10 | 1.05 | 1.00 |

TABLE 5

$A/t2 = 1.75$

| | | $t2/t1$ | | | | |
|---|---|---|---|---|---|---|
| | | 0.43 | 0.50 | 0.57 | 0.64 | 0.71 |
| Full angle at half maximum (°) | AVE | 33 | 36 | 39 | 42 | 45 |
| Reverberation time (ms) | AVE | 2.08 | 1.46 | 1.25 | 1.14 | 1.07 |
| | MAX | 2.25 | 1.60 | 1.35 | 1.25 | 1.15 |
| | MIN | 1.90 | 1.30 | 1.10 | 1.05 | 1.00 |

TABLE 6 t2/t1 = 0.43

|  |  | A/t2 | | | | |
| --- | --- | --- | --- | --- | --- | --- |
|  |  | 0.75 | 1.00 | 1.25 | 1.50 | 1.75 |
| Full angle at half maximum (°) | AVE | 29 | 30 | 31 | 32 | 33 |
| Reverberation time (ms) | AVE | 2.25 | 2.20 | 1.97 | 1.84 | 1.72 |
|  | MAX | 2.60 | 2.35 | 2.10 | 1.90 | 1.75 |
|  | MIN | 2.00 | 2.00 | 1.90 | 1.80 | 1.70 |

TABLE 7 t2/t1 = 0.50

|  |  | A/t2 | | | | |
| --- | --- | --- | --- | --- | --- | --- |
|  |  | 0.75 | 1.00 | 1.25 | 1.50 | 1.75 |
| Full angle at half maximum (°) | AVE | 32 | 33 | 34 | 35 | 36 |
| Reverberation time (ms) | AVE | 1.85 | 1.80 | 1.49 | 1.38 | 1.32 |
|  | MAX | 2.20 | 1.95 | 1.60 | 1.40 | 1.35 |
|  | MIN | 1.60 | 1.60 | 1.40 | 1.35 | 1.30 |

TABLE 8 t2/t1 = 0.57

|  |  | A/t2 | | | | |
| --- | --- | --- | --- | --- | --- | --- |
|  |  | 0.75 | 1.00 | 1.25 | 1.50 | 1.75 |
| Full angle at half maximum (°) | AVE | 35 | 36 | 37 | 38 | 39 |
| Reverberation time (ms) | AVE | 1.45 | 1.35 | 1.14 | 1.02 | 1.02 |
|  | MAX | 1.70 | 1.45 | 1.20 | 1.05 | 1.05 |
|  | MIN | 1.20 | 1.20 | 1.10 | 1.00 | 1.00 |

TABLE 9 t2/t1 = 0.64

|  |  | A/t2 | | | | |
| --- | --- | --- | --- | --- | --- | --- |
|  |  | 0.75 | 1.00 | 1.25 | 1.50 | 1.75 |
| Full angle at half maximum (°) | AVE | 38 | 39 | 40 | 41 | 42 |
| Reverberation time (ms) | AVE | 1.37 | 1.29 | 1.09 | 1.02 | 1.02 |
|  | MAX | 1.65 | 1.40 | 1.15 | 1.05 | 1.05 |
|  | MIN | 1.15 | 1.15 | 1.05 | 1.00 | 1.00 |

TABLE 10 t2/t1 = 0.71

|  |  | A/t2 | | | | |
| --- | --- | --- | --- | --- | --- | --- |
|  |  | 0.75 | 1.00 | 1.25 | 1.50 | 1.75 |
| Full angle at half maximum (°) | AVE | 41 | 42 | 43 | 44 | 45 |
| Reverberation time (ms) | AVE | 1.35 | 1.27 | 1.07 | 1.02 | 1.02 |
|  | MAX | 1.65 | 1.40 | 1.15 | 1.05 | 1.05 |
|  | MIN | 1.15 | 1.15 | 1.05 | 1.00 | 1.00 |

Figure 10:
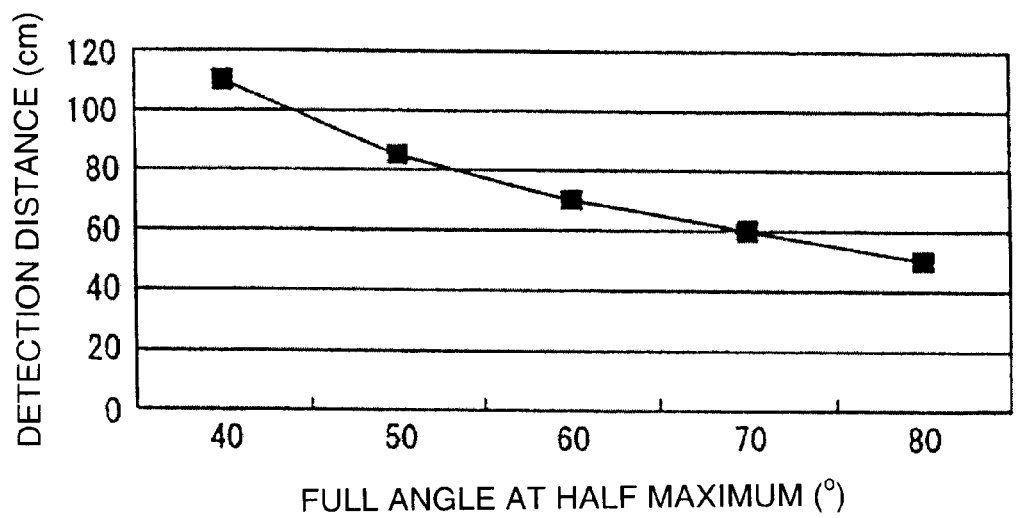
FIG. 10 is a diagram showing the relationship between the full angle at half maximum and the detection distance.

Next, Table 11 and FIG. 10 show the relationship between the full angle at half maximum and the detection distance in the vertical direction, with an installation height of 40 cm set, when the ultrasonic wave transmitter/receiver 10 is used as a back sensor for use in a car as shown in FIG. 10.

TABLE 11

| | Full angle at half maximum (°) | | | | |
| --- | --- | --- | --- | --- | --- |
| | 40 | 50 | 60 | 70 | 80 |
| Detection distance (cm) | 110 | 85 | 70 | 60 | 50 |

Installation position of ultrasonic wave transmitter/receiver: a height of 40 cm above ground As can be seen from Table 11 and FIG. 10, the smaller the full angle at half maximum is, the longer the detection distance is. Particularly, the detection distance in a case where the full angle at half maximum is 40° is 1.5 times as long as that in a case where the full angle at half maximum is 60°. However, in this ultrasonic wave transmitter/receiver 10, since the transmitting/receiving, surface serves as both a transmitting surface and a receiving surface for ultrasonic waves, unless the vibrations when ultrasonic waves are transmitted are isolated in a time as short as possible, reflected waves will be buried in the vibrations when transmitted, and will inhibit the ultrasonic wave transmitter/receiver from performing a detection. Hence, it is practically required, in addition to that the full angle at half maximum is small, that the reverberation time is not more than 1.5 ms under the conditions that water drops are adhered to the transmitting/receiving surface. If the reverberation time is not more than 1.5 ms with water drops adhered to the transmitting/receiving surface, a less reverberation time will be obtained under the dry conditions.

Accordingly, from the above results, the conditions which simultaneously meet the properties that the full angle at half maximum is not more than 40°, and that the reverberation time is not more than 1.5 ms, are shown in Table 12.

TABLE 12

| | | t2/t1 | | | | |
| --- | --- | --- | --- | --- | --- | --- |
| | | 0.43 | 0.50 | 0.57 | 0.64 | 0.71 |
| A/t2 | 0.75 | o/ | o/ | o/o | o/o | /o |
| | 1.00 | o/ | o/ | o/o | o/o | /o |
| | 1.25 | o/ | o/o | o/o | o/o | /o |
| | 1.50 | o/ | o/o | o/o | /o | /o |
| | 1.75 | o/ | o/o | o/o | /o | /o | o/: Full angle at half maximum = 40° or less
/o: Reverberation time = 1.5 ms or less In order to achieve the effects intended by the present invention as can be seen from Table 12, when the ratio of the thickness t2 of the thin-walled portion 16 with respect to the thickness t1 of the thick-walled portion 14 is 0.57, it is desirable that the ratio of the thickness A of the side portion 12a a with respect to the thickness t2 of the thin-walled portion 16 be set to 0.75 to 1.75.

When the ratio of the thickness t2 of the thin-walled portion 16 with respect to the thickness t1 of the thick-walled portion 14 is 0.50, it is desirable that the ratio of the thickness A of the side portion 12a with respect to the thickness t2 of the thin-walled portion 16 be set to 1.25 to 1.75.

Also, when the ratio of the thickness t2 of the thin-walled portion 16 with respect to the thickness t1 of the thick-walled portion 14 is 0.64, it is desirable that the ratio of the thickness A of the side portion 12a with respect to the thickness t2 of the thin-walled portion 16 be set to 0.75 to 1.25.

Figure 7:
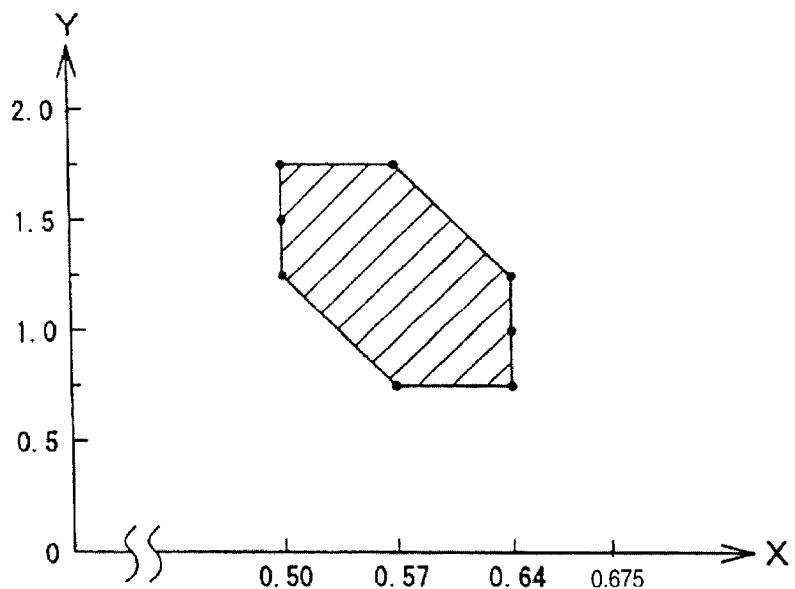
FIG. 7 is a diagram showing a desirable range of numeric values when $x = t2/t1$, and $y = A/t2$.

From these results, the relationship shown in FIG. 7 are induced. That is, when x=t2/t1, and y=A/t2, the thickness t1 of the thick-walled portion 14, the thickness t2 of each of the thin-walled portions 16, and the thickness A of the side portion 12a are set so that x and y are within the range defined by the following equations, whereby the effects intended by the present invention can be achieved.

$$0.50 \leq x \leq 0.64 \quad (1)$$

$$0.75 \leq y \leq 1.75 \quad (2)$$

$$y \leq -(50/7) \cdot x + 163/28 \quad (3)$$

$$y \geq -(50/7) \cdot x + 135/28 \quad (4)$$

Figure 8:
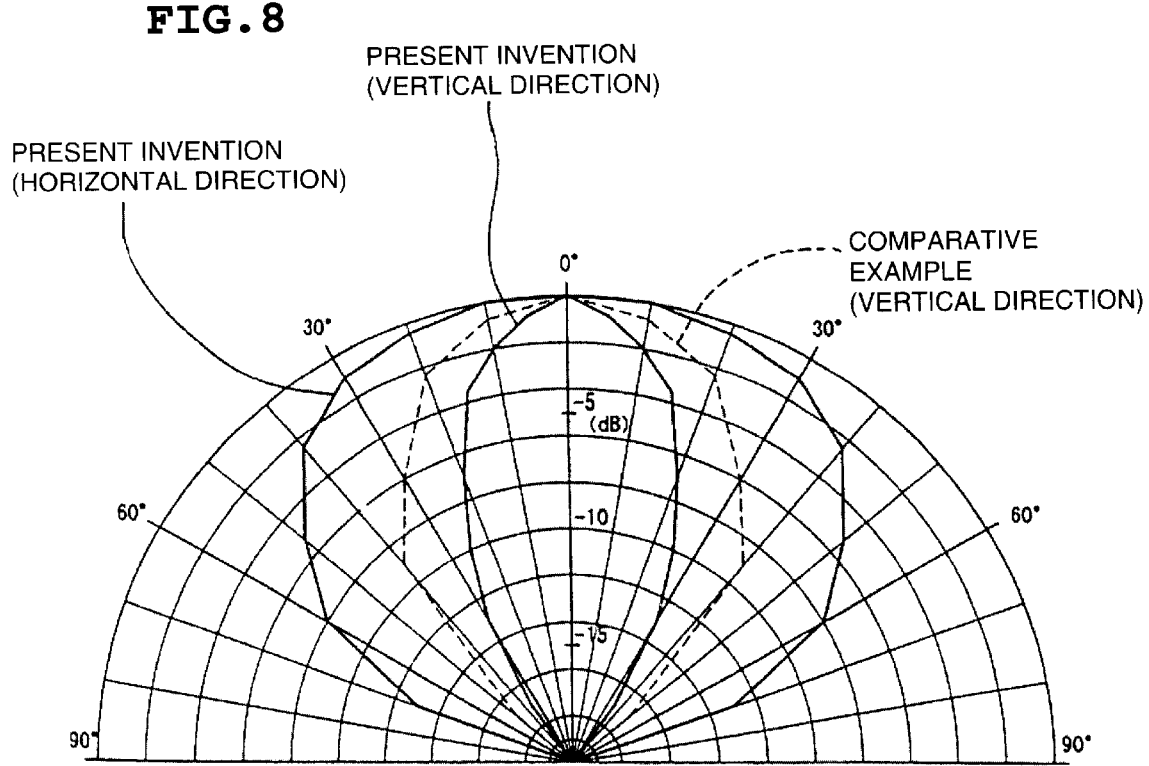
FIG. 8 is a diagram showing the transmission/reception sensitivity of ultrasonic wave transmitter/receivers.
Figure 9:
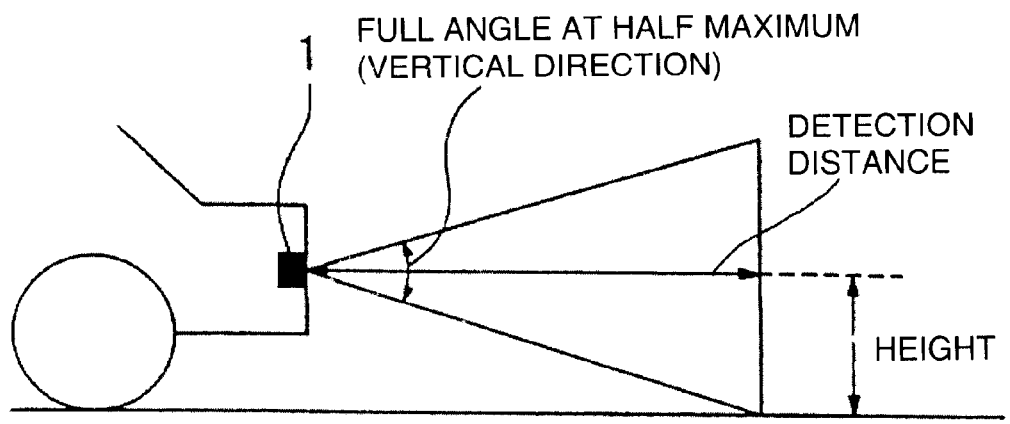
FIG. 9 is a diagrammatic view showing the detection range of a back sensor for use in a car.

In FIG. 8, the solid lines show the directivity characteristics in the vertical and horizontal directions of the ultrasonic wave transmitter/receiver 10 in accordance with an embodiment using an aluminum case wherein the diameter is 18 mm, the thickness t1 of the thick-walled portion 14 is 0.70 mm, the thickness t2 of each of the thin-walled portions 16 is 0.40 mm, and the thickness A of the side portion 12a provided continuously with the thin-walled portions is 0.4 mm.

Also, in FIG. 8, the broken lines show the directivity characteristics in the vertical direction of the ultrasonic wave transmitter/receiver 10 in accordance with a comparative example using an aluminum case wherein the diameter is 18 mm, the thickness t1 of the thick-walled portion is 0.70 mm, the thickness t2 of each of the thin-walled portions is 0.30 mm, and the thickness A of the side portion 12a provided continuously with the thin-walled portion is 0.4 mm.

It is obvious from FIG. 8 that the full angle at half maximum (approximately 30°) of the ultrasonic wave transmitter/receiver 10 in accordance with the embodiment of the present invention provides superior directivity characteristics in the vertical direction to the full angle at half maximum (approximately 60°) of the conventional example.

Thus, in accordance with the ultrasonic wave transmitter/receiver 10 of this embodiment, since the full angle at half maximum in the vertical direction is not more than 40°, the detection distance can be made longer, and is hardly subjected to influences of reflected waves from the ground. Furthermore, in accordance with the ultrasonic wave transmitter/receiver 10 of this embodiment, since the reverberation time is not more than 1.5 ms when water drops are adhered to the transmitting/receiving surface, the influence of transmission waves upon reflected waves can be minimized.

As is evident from the foregoing, in accordance with the present invention, an ultrasonic wave transmitter/receiver is provided in which the transmission/reception range thereof in at least one direction is relatively narrow, and which has stable reverberation characteristics. This ultrasonic wave transmitter/receiver has a long detection distance, and can be used as a back sensor having a superior performance.

While the present invention has been described with reference to what are at present considered to be the preferred embodiments, it is to be understood that various changes and modifications may be made thereto without departing from the invention in its broader aspects and therefore, it is intended that the appended claims cover all such changes and modifications as fall within the true spirit and scope of the invention.

What is claimed is:

1. An ultrasonic wave transmitter/receiver, comprising:

a cylindrical case having a bottom including an inner bottom surface and an outer bottom surface;

a piezoelectric vibrator fixed on the inner bottom surface of the bottom of said case;

a sound absorbing material disposed on the piezoelectric vibrator;

a first adhesive filled in the inner bottom surface of the case to surround the sound absorbing material and the piezoelectric vibrator;

a second adhesive having a lower viscosity than the first adhesive, said second adhesive being filled over the first adhesive;

an ultrasonic wave transmitting/receiving surface defined by the outer bottom surface of the bottom of said case;

said bottom of said case including a thick-walled portion on which said piezoelectric vibrator is fixed, and a thin-walled portion thinner than said thick-walled portion; and when the thickness of said thick-walled portion is t1, the thickness of said thin-walled portion is t2, the thickness of a side portion provided continuously with said thin-walled portion is A, and the equations are set as x=t2/t1, and y=A/t2, said ultrasonic wave transmitter/receiver being formed so that x and y are within the range defined by the following equations:

$$0.50 \leq x \leq 0.64$$

$$0.75 \leq y \leq 1.75$$

$$y \leq -(50/7) \cdot x + 163/28$$

$$y \geq -(50/7) \cdot x + 135/28.$$

* * * * *